United States Patent Office 3,485,380
Patented Dec. 23, 1969

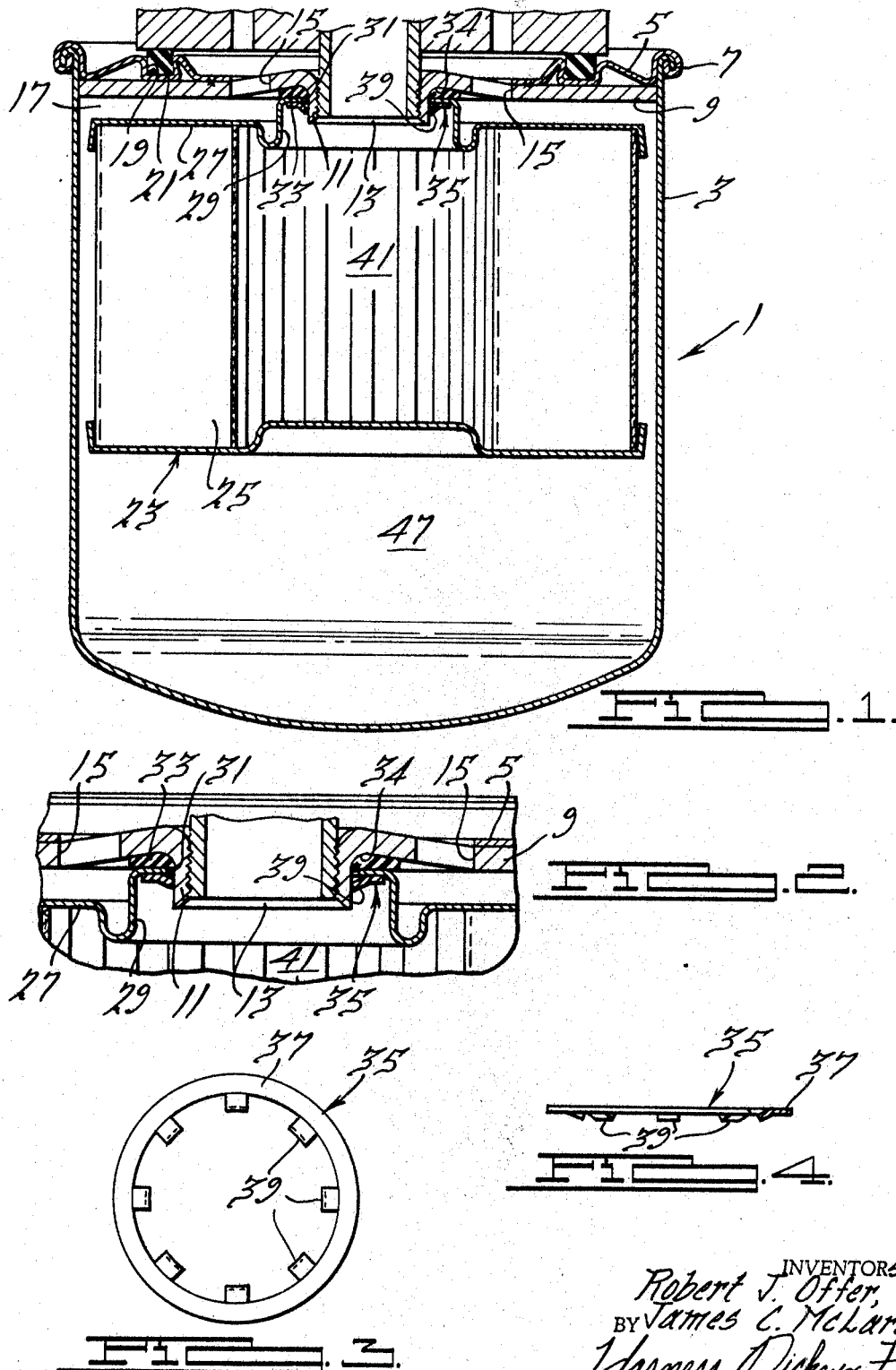

3,485,380
FILTER WITH RATCHET RETAINING RING
Robert J. Offer and James C. McLaren, Racine, Wis., assignors to Walker Manufacturing Company, Racine, Wis., a corporation of Delaware
Filed Mar. 20, 1968, Ser. No. 714,494
Int. Cl. B01d 29/06
U.S. Cl. 210—444
3 Claims

ABSTRACT OF THE DISCLOSURE

A throwaway filter assembly has a housing with a base plate having a threaded tubular extrusion for threaded attachment to the filter base. A filter element is located inside the housing and it has an end cap which presses against a seal around the tubular extrusion and is held tightly in place by a ratchet type retaining ring pressed over the extrusion.

BRIEF SUMMARY OF THE INVENTION

It is the purpose of the present invention to increase the water-holding capacity of a filter assembly, particularly one of the throwaway type such as may be used for filtering fuel, hydraulic fluid, or lubrication oil.

In normal filter constructions, an increase in the water-holding capacity would be accomplished by increasing the volume of empty space in the filter housing. This, however, creates, in the conventional filter, a manufacturing problem because the filter element hold-down spring must be increased in length to accommodate the increased empty space and this increase in length raises the possibility of cocking or misalignment of the hold-down spring so that bypassing of the filter at the seal can occur.

The present invention avoids the problem just described by use of a push-on retaining ring which holds the filter element in place on the tubular portion of the base plate and therefore eliminates the need for a lengthy coil spring.

DESCRIPTION OF THE DRAWINGS

FIGURE 1 is a longitudinal cross section through a throwaway type fuel filter construction containing a filter element secured in place by means of the present invention;

FIGURE 2 is an enlarged view, partly broken away, of the connection between the filter element and the base plate;

FIGURE 3 is a plan view of a suitable ratchet type retaining ring that may be used in the practice of this invention; and FIGURE 4 is a side elevation of the structure shown in FIGURE 3.

DETAILED DESCRIPTION OF THE INVENTION

The filter construction 1 has a cup-shaped housing member 3 which is closed at its open end by a plate-like housing member 5 which is interlocked in a turned over joint 7 with the end of the housing member or shell 5. Located inside of and spot welded to the end member 5 is a reinforcement plate 9 which has a centrally located tubular extrusion or neck 11 that is internally threaded at 13 so that it can be attached to a stand-pipe or nipple (not shown) on a filter base to which the filter 1 is to be attached. The plate 9 has inlet holes 15 which admit liquid to be filtered to the chamber 17 inside the housing 3. The end plate 5 is formed with an annular groove or recess 19 which receives a gasket 21 that will be pressed against a sealing surface on the filter base when the filter 1 is threaded home on the stand-pipe or nipple. This seals off a chamber for incoming fluid to pass through the openings 15.

Located inside of the filter housing is a filter element 23 which has a pleated paper filter media 25, although other media may be used in the practice of the invention. The top end of the filter media 25 is closed by an end cap 27 which is glued or adhered to the ends of the pleats. The end cap 27 has an offset or tubular central portion 29 which terminates in an inwardly extending radial flange 31. The flange 31 presses tightly against a gasket or seal 33 which surrounds the outlet neck 11 at the corner 34 and prevents bypassing of fluid from the inlet openings 15 to the neck 11.

In accordance with this invention, the flange 31 is held tightly against the seal 33 by means of the retaining ring 35 which appears in FIGURES 3 and 4. The ring 35 is available on the open market and comprises a ring-like outer portion 37 and a plurality of radial inwardly extending ratchet fingers 39. The ring 35 is preferably formed of spring steel and the fingers are inclined slightly to the plane of the outer portion of the ring as seen in FIGURE 4 and therefore act as ratchet teeth to dig into the outer surface of the outlet neck 11 after the ring has been pressed in place to positively hold the filter element in position against and compressing the seal 33.

In actual assembly of the filter 1 utilizing the ring 35 a subassembly of filter paper 25 and end cap 27 is secured by ring 35 to the neck 11 of a subassembly of plates 5 and 9. During such operation, a suitable tool may be inserted in center chamber 41 of the media 25 to press the ring 35 home and compress seal 33. Thereafter the end cap is adhered to the bottom of the pleated paper 25 closing off the bottom of chamber 41. Following this, the subassembly of filter element 23 and plates 5 and 9 can be inserted in housing member 3 and the interlocked joint 7 formed to provide the completed filter assembly 1.

In actual use, the filter construction 1 is preferably disposed upright as shown so that the space 47 below the filter element is in fact located beneath the filter element 23 to enable water to accummulate in it by gravity. The oil or fuel being lighter than water flows from the inlet ports 15 through the pleated paper 25 into the outlet chamber 41 and out of the outlet neck 11 to the point of usage or storage.

Modifications may be made without departing from the spirit and scope of the invention.

We claim:
1. The method of constructing a throwaway filter which comprises forming an end plate having a central tubular portion on it with a corner between the tubular portion and the adjacent portion of the plate, inserting an annular seal in said corner, forming a filter element subassembly of filter media and one end cap with said end cap having a flange adapted to fit around a tubular portion of the end plate and against said seal, mounting the filter element subassembly on the tubular portion of the end plate so that the flange presses tightly against the seal and pressing a ratchet-type retaining ring on the tubular portion to hold said flange in place against the seal, attaching the other end cap to the filter media, inserting the filter element inside a cup-shaped housing member, and securing the end plate to the end of the cup-shaped housing member.

2. In a throwaway filter construction, a housing having an end plate with a tubular outlet neck extending toward the interior of the housing, an annular resilient seal mounted on the tubular neck of the end plate, a filter element having an end cap mounted on the neck and pressing against the seal, and a ratchet retaining ring on the outlet neck holding the end cap and filter element on the neck and in sealed engagement with the seal.

3. A throwaway filter construction comprising a cup-shaped housing, an end plate closing the open end of the housing and permanently secured to the housing, said end plate having a tubular outlet neck extending into the housing, said neck being centrally located on said plate and extending substantially normally to the plane of the plate and making a corner located inside the housing, a filter member inside said housing including an annular outside-in filter element having an outlet chamber communicating with said outlet neck, said member including an end cap attached to said element having an aperture therein, said neck extending through said aperture into said outlet chamber, a seal in said corner engaging said end cap, and a ratchet type retaining ring mounted on said neck on the side of the cap opposite said seal and having radial teeth biting into said neck to hold the end cap and filter member in place against said seal on said neck.

References Cited

UNITED STATES PATENTS 3,300,049   1/1967   Handcastle _____ 210—232

FOREIGN PATENTS 358,496   10/1931   Great Britain.

REUBEN FRIEDMAN, Primary Examiner

T. A. GRANGER, Assistant Examiner